(12) United States Patent
Atohira

(10) Patent No.: US 8,694,158 B2
(45) Date of Patent: Apr. 8, 2014

(54) OFF-LINE PROGRAMMING SYSTEM

(71) Applicant: Fanuc Corporation, Yamanashi (JP)

(72) Inventor: Hiroyuki Atohira, Yamanashi (JP)

(73) Assignee: Fanuc Corporation, Yamanashi (JP)

( * ) Notice: Subject to any disclaimer, the term of this patent is extended or adjusted under 35 U.S.C. 154(b) by 0 days.

(21) Appl. No.: 13/850,807

(22) Filed: Mar. 26, 2013

(65) Prior Publication Data

US 2013/0325177 A1    Dec. 5, 2013

(51) Int. Cl.
*G05B 19/00*      (2006.01)

(52) U.S. Cl.
USPC ............. 700/245; 901/3; 901/43; 700/183; 700/184

(58) Field of Classification Search
CPC ..................................................... B25J 9/1671
USPC ............................................ 901/3, 43
See application file for complete search history.

(56) References Cited

U.S. PATENT DOCUMENTS

| | | | |
|---|---|---|---|
| 6,750,425 B2 * | 6/2004 | Mukae et al. | 219/121.78 |
| 2003/0130757 A1 * | 7/2003 | Kamiya | 700/182 |
| 2004/0085377 A1 * | 5/2004 | Nielsen et al. | 347/19 |
| 2006/0025890 A1 * | 2/2006 | Nagatsuka et al. | 700/253 |
| 2006/0181236 A1 * | 8/2006 | Brogardh | 318/568.1 |
| 2012/0123590 A1 * | 5/2012 | Halsmer | 700/264 |
| 2012/0156362 A1 * | 6/2012 | Sadovoy et al. | 427/9 |
| 2012/0220194 A1 * | 8/2012 | Maloney et al. | 451/5 |
| 2012/0290130 A1 * | 11/2012 | Kapoor | 700/247 |

FOREIGN PATENT DOCUMENTS

| | | | |
|---|---|---|---|
| JP | 5-289722 A | 11/1993 | |
| JP | 07168617 A | 7/1995 | |
| JP | 09244722 A | 9/1997 | |
| JP | 09244723 A | 9/1997 | |
| JP | 2000153480 A | 6/2000 | |
| JP | 2001060108 A | 3/2001 | |
| JP | 3500739 B | 2/2004 | |
| JP | 3903617 B | 4/2007 | |
| JP | 4246324 B | 1/2009 | |
| JP | 2012061529 A | 3/2012 | |

* cited by examiner

*Primary Examiner* — Khoi Tran
*Assistant Examiner* — Ryan Rink
(74) *Attorney, Agent, or Firm* — Lowe Hauptman & Ham, LLP

(57) ABSTRACT

An off-line programming system (10) which includes a three-dimensional shape arranging unit (27) which fills in a curved surface or consecutive plurality of flat surfaces of a selected three-dimensional shape by selected operation patterns and arranges a three-dimensional shape in a virtual space so that the operation patterns will be projected on surfaces of the workpiece model, a working path preparing unit (28) which projects operation patterns on the surfaces of the workpiece model so as to prepare a working path of the tool, and a tool position/posture determining unit (29) which uses the prepared working path and normal direction of the surface of the workpiece model as the basis to automatically determined the position or position/posture of the tool model.

7 Claims, 17 Drawing Sheets

OFF-LINE PROGRAMMING SYSTEM

RELATED APPLICATIONS

The present application is based on, and claims priority from, Japanese Application Number 2012-123053, filed May 30, 2012, the disclosure of which is hereby incorporated by reference herein in its entirety.

BACKGROUND OF THE INVENTION

1. Field of the Invention

The present invention relates to an off-line programming system which teaches a program of a robot which is provided with a tool which works a workpiece which is arranged in a work space, that is, a worked part.

2. Description of the Related Art

When using a tool which is provided at a robot to work a workpiece, the operation of the robot has to be taught in advance. Japanese Patent Publication No. 5-289722A discloses to teach movement start points and movement end points of a tool for working a workpiece at a surface of a workpiece to be painted so as to prepare a working path for the tool.

Further, Japanese Patent No. 3500739 discloses to judge the part of a workpiece to be worked from the number of designated teaching points so as to prepare a working path. Furthermore, Japanese Patent No. 3903617 discloses to divide a work region of a robot by parallel lines and calculate operating points of a reciprocating operation of the robot as developed reciprocating data. Furthermore, Japanese Patent No. 4246324 discloses to use the position/posture of a tool which has been stored at the time of actual work as the basis for a worker to prepare operation patterns for utilization in the work of teaching the robot.

However, to completely work the entire surface of a workpiece in the conventional art, it is necessary to find the tool position or position/posture at an extremely large number of locations on the workpiece. Furthermore, if the surface of the workpiece to be worked includes a curved surface part, it is difficult to prepare the tool working path so as to suitable for the surface of the workpiece. For this reason, a large number of steps were required for preparing such a working path.

The present invention was made in consideration of such a situation and has as its object to provide an off-line programming system which enables the number of steps for finding the position or position/posture of a tool which works a workpiece to be greatly reduced.

SUMMARY OF INVENTION

To achieve the above-mentioned object, according to a first aspect, there is provided an off-line programming system which teaches a program to a robot which is provided with a tool which works a workpiece which is arranged in a work space, the off-line programming system comprising a virtual space preparing unit which prepares a virtual space which expresses the work space three-dimensionally, a model arranging unit which arranges a workpiece model of the workpiece, a robot model of the robot, and a tool model of the tool in the virtual space which has been prepared by the virtual space preparing unit, an operation pattern storage unit which stores a plurality of types of the operation patterns which are comprised of consecutive paths which show cyclic operations of the tool, a three-dimensional shape storage unit which stores three-dimensional shapes which includes a curved surface and a three-dimensional shape which includes a consecutive plurality of flat surfaces, an operation pattern selecting unit which selects one type of operation pattern from the plurality of types of operation patterns which are stored in the operation pattern storage unit, a three-dimensional shape selecting unit which selects the three-dimensional shape which includes a curved surface or the three-dimensional shape which includes a consecutive plurality of flat surfaces from the three-dimensional shape storage unit, a three-dimensional shape arranging unit which fills in the curved surface or the consecutive plurality of flat surfaces of the three-dimensional shape which was selected by the three-dimensional shape selecting unit by one type of operation pattern which was selected by the operation pattern selecting unit and arranges the three-dimensional shape in the virtual space so that the operation patterns will be projected on at least one surface of the workpiece model, a working path preparing unit which projects the operation patterns which fill in the curved surface or the consecutive plurality of flat surfaces of the three-dimensional shape on the at least one surface of the workpiece model to prepare a working path of the tool, and a tool position/posture determining unit which uses the working path which was prepared by the working path preparing unit and a normal direction of the at least one surface of the workpiece model as the basis to automatically determine the position or position/posture of the tool model.

According to a second aspect, there is provided the first aspect further comprising a projection direction designating unit which designates a direction of projection of the operation patterns which fill in the curved surface or the consecutive plurality of flat surfaces of the three-dimensional shape on the at least one surface of the workpiece model.

According to a third aspect, there is provided the first aspect further comprising a dimension changing unit which changes a dimension of the three-dimensional shape.

According to a fourth aspect, there is provided the first aspect further comprising a pitch interval changing unit which changes a pitch interval of the cyclic operation at the operation patterns.

According to a fifth aspect, there is provided the first aspect further comprising a direction designating unit which designates at least one of an advancing direction and reciprocating direction of the tool which is shown by the operation patterns.

According to a sixth aspect, there is provided the first aspect further comprising a position changing unit which changes a start point and end point of reciprocating motion at the operation patterns.

According to a seventh aspect, there is provided the first aspect further comprising a contact region designating unit which designates a contact region of the tool which contacts the workpiece in the virtual space and wherein the tool position/posture determining unit uses the contact region which was designated by the contact region designating unit as the basis to automatically find the position or position/posture of the tool model when contacting the workpiece model from the working path.

These objects, features, and advantages of the present invention and other objects, features, and advantages will become further clearer from the detailed description of typical embodiments of the present invention which are shown in the attached drawings.

DETAILED DESCRIPTION

Below, the attached figures will be referred to so as to explain the embodiments of the present invention. In the following figures, similar members are assigned similar reference signs. To facilitate understanding, these figures are suitably changed in scale.

Figure 1:
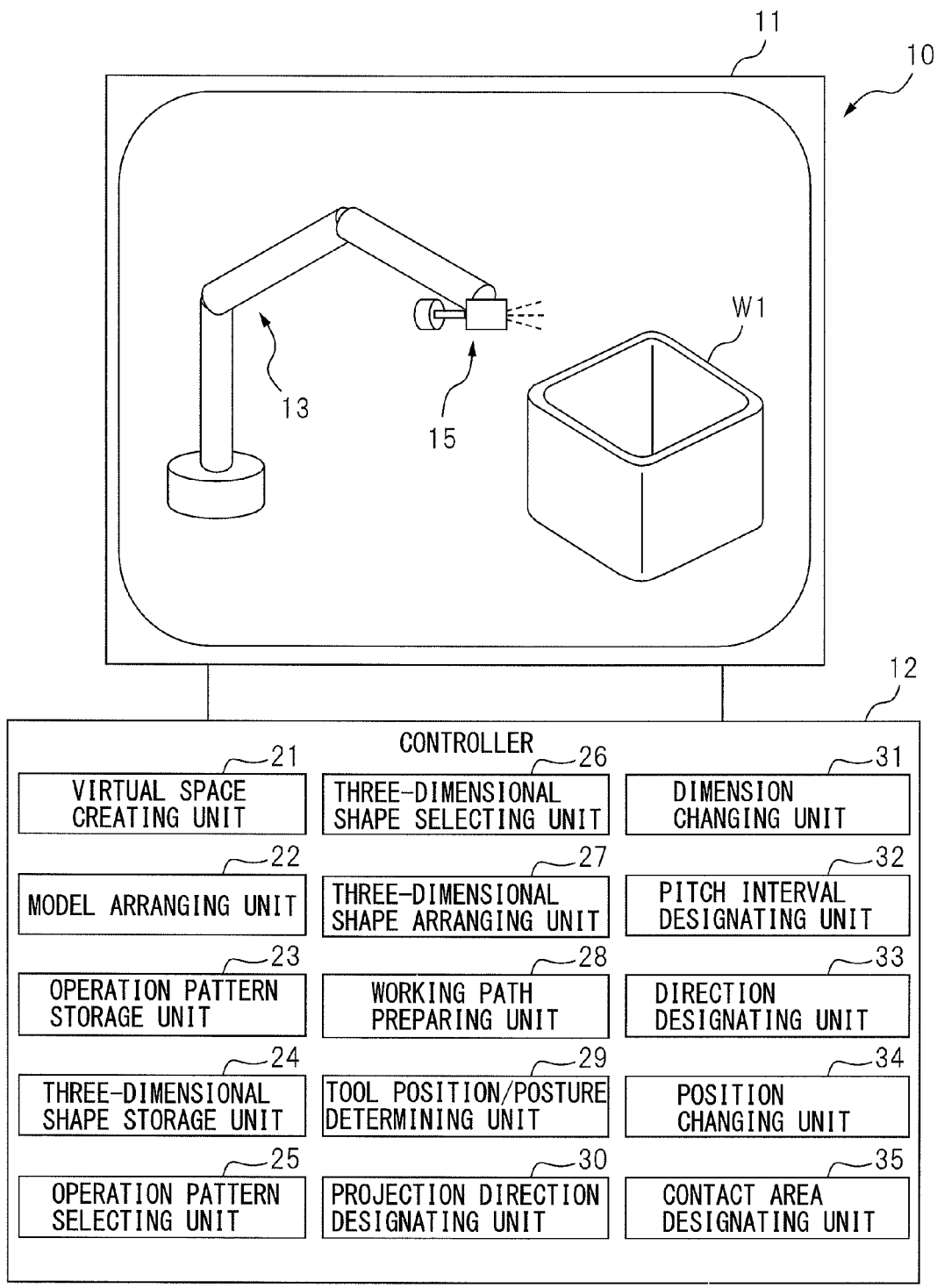
FIG. 1 is a conceptual view of an off-line programming system according to a first embodiment of the present invention.

FIG. 1 is a conceptual view of an off-line programming system according to a first embodiment of the present invention. As shown in FIG. 1, the off-line programming system 10 mainly includes a display unit 11, for example, a liquid crystal display or CRT etc., and a controller 12, for example, a digital computer.

As can be seen from FIG. 1, the display unit 11 shows a model of a robot 13 which is provided with a tool 15 and a model of a workpiece W. The positional relationship between these models of the tool 15, robot 13, and workpiece W corresponds to the actual positional relationship thereof. Therefore, the off-line programming system 10 is used for teaching off-line a program when the robot 13 which is provided with the tool 15 works a workpiece W. Note that, the models of the tool 15, robot 13, workpiece W, etc. will sometimes simply be referred to as the tool 15, robot 13, workpiece W, etc.

Here, the tool 15 of the first embodiment is a blast device which ejects particles of a polishing agent etc. for cleaning. Further, the workpiece W is a closed bottom box shape. Its cross-section is a rectangle which has rounded corners. Below, such a shape of a workpiece W will be referred to as the "first workpiece W1".

As shown in FIG. 1, the controller 12 performs the roles of a virtual space preparing unit 21 which prepares a virtual space which expresses three-dimensionally a work space of a robot 13 and of a model arranging unit 22 which arranges a workpiece model of a workpiece W, a robot model of a robot 13, and a tool model of a tool 15 inside the virtual space which was prepared by the virtual space preparing unit 21. As explained above, the positional relationship among the tool model, robot model, and workpiece model corresponds to the positional relationship among the tool 15, robot 13, and workpiece W in the actual work space.

Furthermore, the controller 12 performs the roles of an operation pattern storage unit 23 which stores a plurality of types of operation patterns comprised of consecutive paths which show cyclic operations of a tool 15, a three-dimensional shape storage unit 24 which stores a three-dimensional shape A2 which includes a curved surface and a three-dimensional shape A1 which includes a consecutive plurality of flat surfaces, an operation pattern selecting unit 25 which selects one type of operation pattern from the plurality of types of the operation patterns which are stored in the operation pattern storage unit 23, and a three-dimensional shape selecting unit 26 which selects the three-dimensional shape A2 which includes a curved surface or the three-dimensional shape A1 which includes a consecutive plurality of flat surfaces from the three-dimensional shape storage unit 24.

Furthermore, the controller 12 performs the role of a three-dimensional shape arranging unit 27 which fills in the curved surface or the consecutive plurality of flat surfaces of the three-dimensional shape which was selected by the three-dimensional shape selecting unit 26 by the one type of operation pattern which was selected by the operation pattern selecting unit 25 and arranges the three-dimensional shape in the virtual space so that the operation patterns will be projected on at least one surface of the workpiece model.

Furthermore, the controller 12 performs the roles of a working path preparing unit 28 which projects the operation patterns which fill in the curved surface or the consecutive plurality of flat surfaces of the three-dimensional shape on the at least one surface of the workpiece model to prepare a working path of the tool and a tool position/posture determining unit 29 which uses the working path which was prepared by the working path preparing unit 28 and a normal direction of the at least one surface of the workpiece model as the basis to automatically determine the position or position/posture of the tool model.

Furthermore, the controller 12 performs the role of a projection direction designating unit 30 which designates a direction of projection of the operation patterns which fill in the curved surface or the consecutive plurality of flat surfaces of the three-dimensional shape on the at least one surface of the workpiece model. Further, the controller performs the roles of a dimension changing unit 32 which changes a dimension of the three-dimensional shapes A1, A2 and a pitch interval changing unit 32 which changes a pitch interval of the cyclic operation at the operation patterns.

Furthermore, the controller 12 performs the role of a direction designating unit 33 which designates at least one of an advancing direction and reciprocating direction of the tool 15 which is shown by the operation patterns. Furthermore, the controller 12 performs the role of a position changing unit 34 which changes a start point and end point of reciprocating motions in the operation patterns. Furthermore, the controller 12 performs the role of a contact region designating unit 35 which designates a contact region of the tool 15 which contacts the workpiece W in the virtual space. Note that the controller 12 is naturally provided with a storage unit which stores various types of data and various types of programs and a mouse, keyboard, and other input devices.

Figure 2:
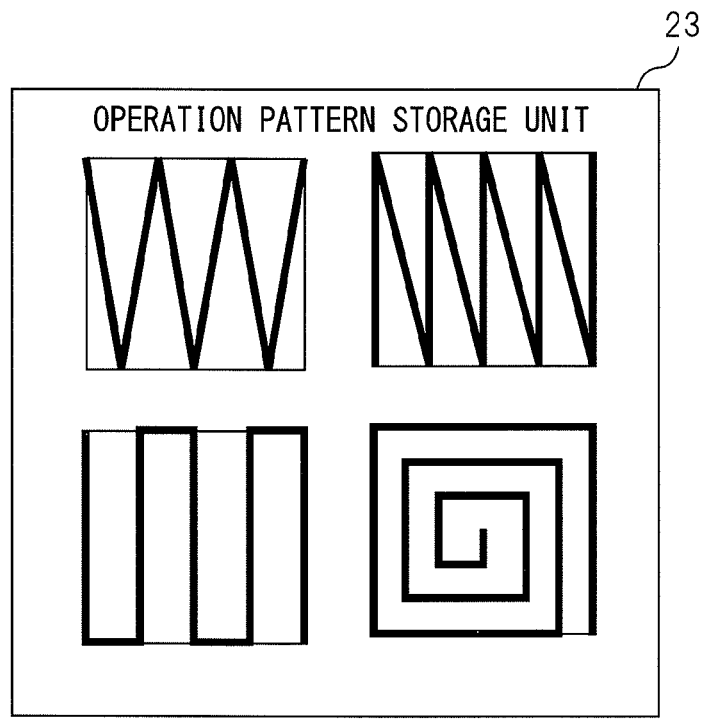
FIG. 2 is a view which shows details of an operation pattern storage unit.

FIG. 2 is a view which shows details of the operation pattern storage unit. The operation pattern storage unit 23 stores a plurality of operation patterns which show operations of a tool. As shown in FIG. 2, the operation patterns are consecutive paths which show a cyclic operation of a tool. The operation patterns include, for example, equal velocity movements in one direction accompanied with repeated reciprocating motions in other directions substantially vertical to the same. In FIG. 2, an approximately figure V-shaped, approximately figure N-shaped, approximately figure U-shaped, and approximately spiral shaped operation patterns are shown. So long as operation patterns which make a tool 15 advance in one direction while making it reciprocally move in directions substantially vertical to the same, other shaped operation patterns may also be stored.

Figure 3:
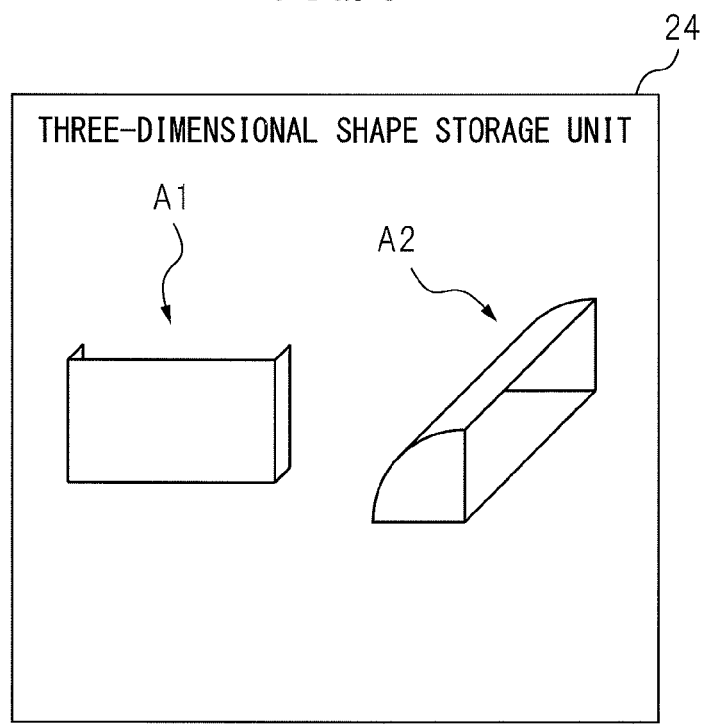
FIG. 3 is a view which shows details of a three-dimensional shape storage unit.

FIG. 3 is a view which shows details of the three-dimensional shape storage unit. As shown in FIG. 3, the three-dimensional shape storage unit 24 mainly stores a three-dimensional shape A1 which includes a consecutive plurality of flat surfaces and a three-dimensional shape A2 which includes a curved surface. In FIG. 3, the three-dimensional shape A1 has three consecutive flat surfaces, but the three-dimensional shape A1 may also have only two consecutive flat surfaces. Further, the adjoining flat surfaces of the three-dimensional shape A1 are at right angles but they may also be at angles different from right angles.

Further, the three-dimensional shape A2 which is shown in FIG. 3 etc. is part of the circumferential surface of a cylinder and has a fan-shaped end face. In FIG. 3, the center angle of the fan-shaped end face is 90°. However, the three-dimensional shape A2 may also have a curved surface different from the circumferential surface of a cylinder. Note that the above-mentioned dimension changing unit 31 is able to change the various dimensions of the three-dimensional shapes A1, A2.

Once selected, the consecutive plurality of flat surfaces of the three-dimensional shape A1 are filled in by one type of operation pattern among the plurality of operation patterns. Similarly, the curved surface of the three-dimensional shape A2 is filled in by one type of operation pattern among the plurality of the operation patterns. However, the other surfaces of the three-dimensional shape A2 are made to not be filled in by the operation patterns.

Figure 4:
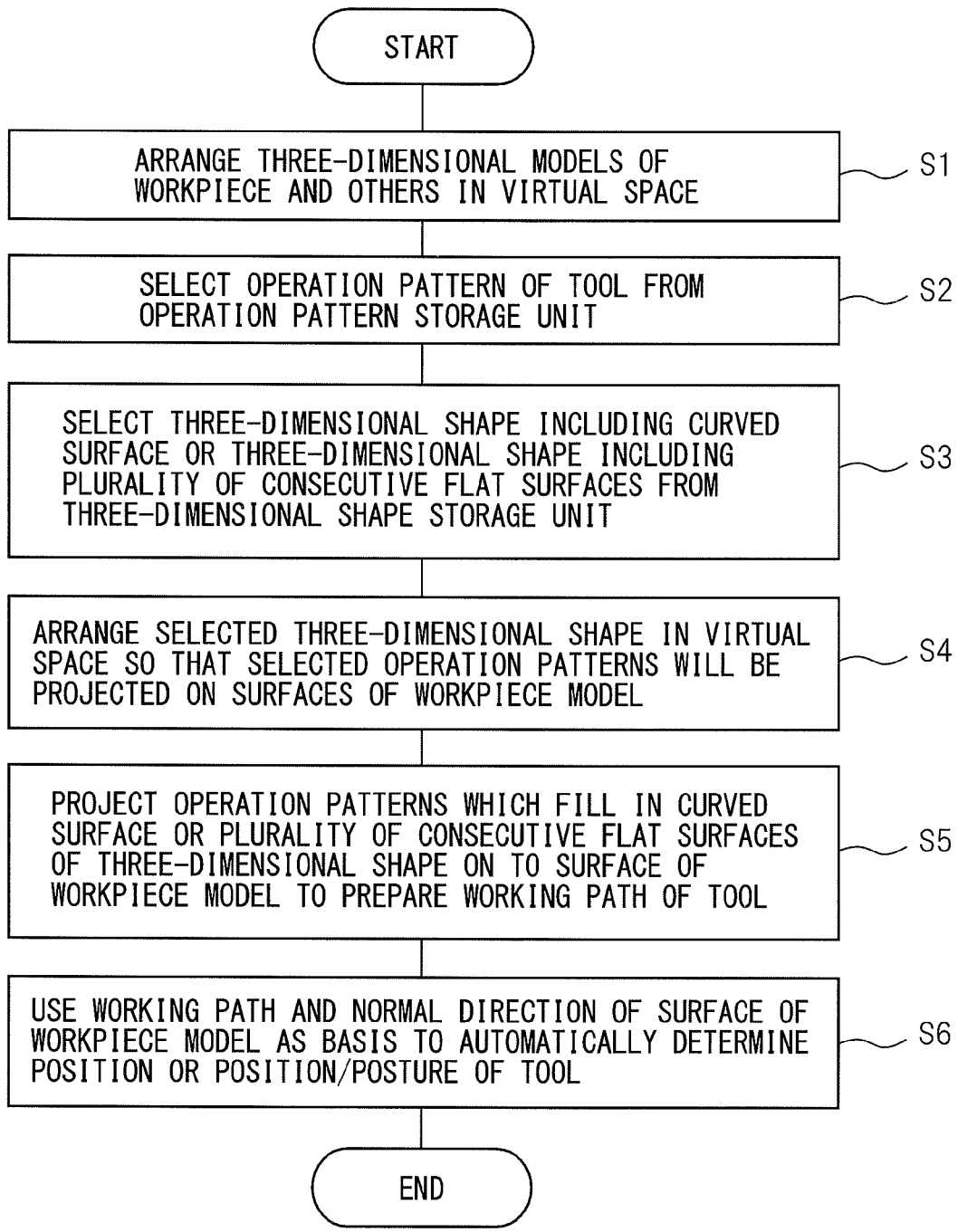
FIG. 4 is a flow chart which shows the operation of the off-line programming system which is shown in FIG. 1.

FIG. 4 is a flow chart which shows the operation of the off-line programming system which is shown in FIG. 1. Below, referring to FIG. 4, the operation of the off-line programming system 10 of the present invention will be explained.

First, in FIG. 4 at step S1, the virtual space preparing unit 21 prepares a virtual space of a work space and displays it on the display unit 11. Furthermore, the model arranging unit 22 prepares models of the tool 15, robot 13, and workpiece W and arranges them in the virtual space of the display unit 11 as explained above.

Then, at step S2, an operator uses the operation pattern selecting unit 25 to select one type of operation pattern from the operation pattern storage unit 23. Furthermore, at step S3, the operator uses the three-dimensional shape selecting unit 26 to similarly select the three-dimensional shape A1 which includes a consecutive plurality of flat surfaces or the three-dimensional shape A2 which includes a curved surface from the three-dimensional shape storage unit 24. Below, the explanation will be continued assuming that an approximately figure U-shaped operation pattern has been selected and the three-dimensional shape A1 which include a consecutive plurality of flat surfaces has been selected.

Then, at step S4, the three-dimensional shape arranging unit 27 fills in the consecutive plurality of flat surfaces of the selected three-dimensional shape A1 by the approximately figure U-shaped operation patterns. Further, the three-dimensional shape arranging unit 27 further arranges such a three-dimensional shape A1 inside the virtual space of the display unit 11.

Figure 5A:
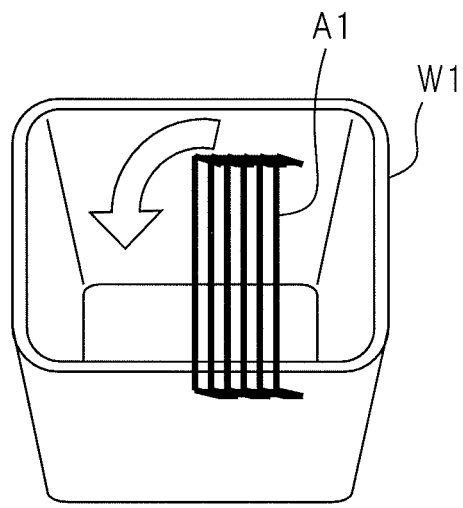
FIG. 5A is a first perspective view of a first workpiece model.

FIG. 5A to FIG. 5D are perspective views of a first workpiece model. As shown in FIG. 5A, with just the three-dimensional shape arranging unit 27 simply arranging the three-dimensional shape A1 in the virtual space of the display unit 11, sometimes the three-dimensional shape A1 will not be suitably oriented with respect to the first workpiece model W1.

Figure 5B:
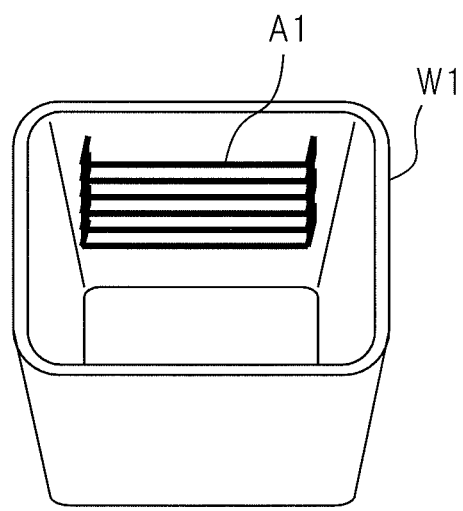
FIG. 5B is a second perspective view of a first workpiece model.

In such a case, as shown in FIG. 5A and FIG. 5B, the three-dimensional shape arranging unit 27 changes the orientation of the three-dimensional shape A1 to be suitable for the first workpiece model W1. Specifically, it positions the three-dimensional shape A1 so that the consecutive plurality of flat surfaces of the three-dimensional shape A1 become parallel to the consecutive plurality of inside surfaces of the first workpiece model W1.

Figure 5C:
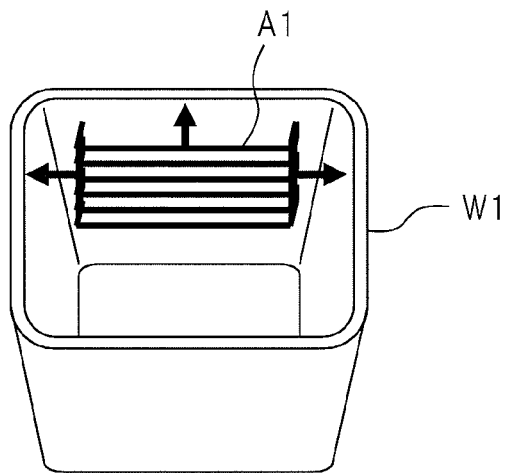
FIG. 5C is a third perspective view of a first workpiece model.
Figure 5D:
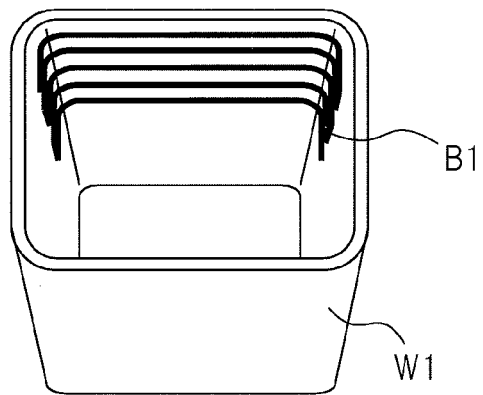
FIG. 5D is a fourth perspective view of a first workpiece model.
Figure 6:
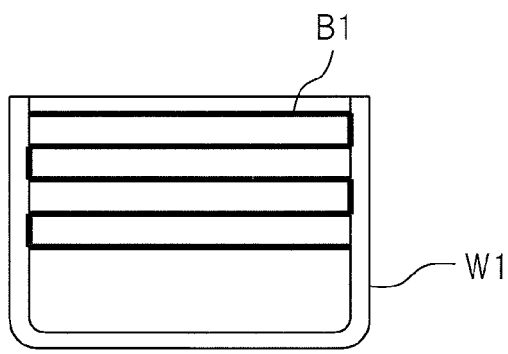
FIG. 6 is a longitudinal cross-sectional view of the first workpiece model which is shown in FIG. 5D.

Referring again to FIG. 4, at step S5, the working path preparing unit 28 projects the operation patterns which fill in the consecutive plurality of flat surfaces of the three-dimensional shape A1 on the inside surfaces of the first workpiece model W1. As shown in FIG. 5C, the operation patterns of the flat surfaces of the three-dimensional shape A1 are projected on the corresponding inside surfaces of the first workpiece model W1. As a result, as shown in FIG. 5D, at the consecutive plurality of flat surfaces of the first workpiece model W1, the projected three-dimensional shape A1 is displayed as the working path B1. Furthermore, if referring to FIG. 6, which is a longitudinal cross-sectional view of the first workpiece model which is shown in FIG. 5D, it will be understood that the working path B1 is similar in shape to the selected approximately figure U-shaped operation patterns.

As can be seen from the drawings, the cross-section of the first workpiece model W1 is a rectangle which has rounded corners, so in particular at the corners, preparation of the working path B1 is difficult. However, in the present invention, the operation patterns are simply projected on the inside surfaces of the workpiece W so as to prepare the working path B1, so even at the corners of the workpiece W, the working path B1 can be easily prepared.

Then, in FIG. 4 at step S6, the working path B1 and the normal direction of the consecutive plurality of inside surfaces of the first workpiece model W1 are used as the basis for the tool position/posture determining unit 29 to automatically determine the position or position/posture of the model of the tool 15. When the tool 15 is at a desired angle with respect to the workpiece W, for example, when the tool 15 is vertical to an inside surface of the first workpiece W1, the tool 15 can effectively perform its function. Therefore, at step S6, the position/posture of the tool 15 at a certain location of the working path B1 is automatically determined if the tool 15 is arranged to become a desired angle with respect to the workpiece W. The tool position/posture determining unit 29 successively executes such work along the working path B1. Due to this, it is possible to determine the position or position/posture of the tool 15 over the working path B1 as a whole.

In this way, in the first embodiment, the operation patterns which fill in the consecutive plurality of flat surfaces of the three-dimensional shape A1 are projected on the inside surfaces of the workpiece W to prepare the working path B1 of the tool 15. For this reason, the prepared working path B1 is suitable for the shape of the inside surfaces of the workpiece W. Furthermore, in the present invention, such a working path B1 may be used as the basis to automatically determine the position or position/posture of the tool 15. Therefore, even if the surface of the workpiece W which is to be worked includes curved portions for example corners, the working path B1 can be easily found. As a result, the number of steps which are required for finding the position or position/posture of the tool 15 can be greatly decreased.

Figure 7:
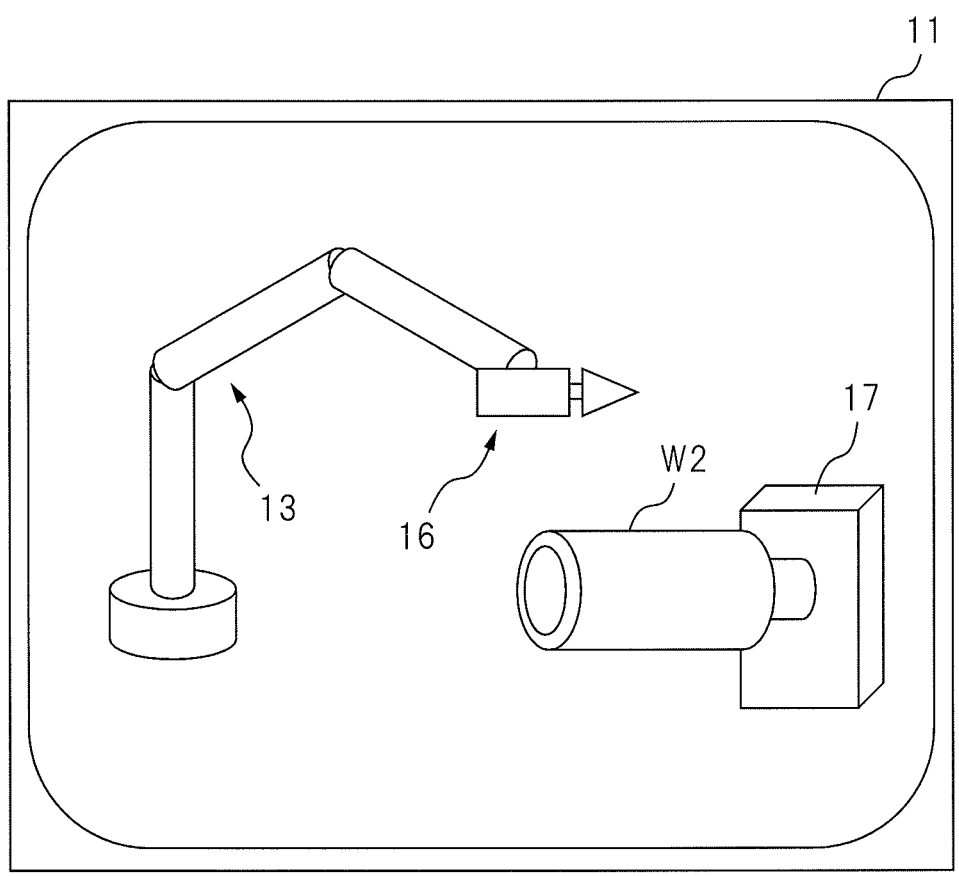
FIG. 7 is a view which shows a display unit of an off-line programming system according to a second embodiment of the present invention.

FIG. 7 is a view which shows a display unit of an off-line programming system according to a second embodiment of the present invention. As can be seen from FIG. 7, the display unit 11 displays a model of a robot 13 which is provided with a tool 16 and a model of a workpiece W. The tool 16 in the second embodiment is a substantially conical shaped grinder. Further, FIG. 7 shows a cylinder shaped workpiece W which is fastened by a fastening part 17. Below, such a shape of workpiece W will be called a "second workpiece W2".

Figure 8A:
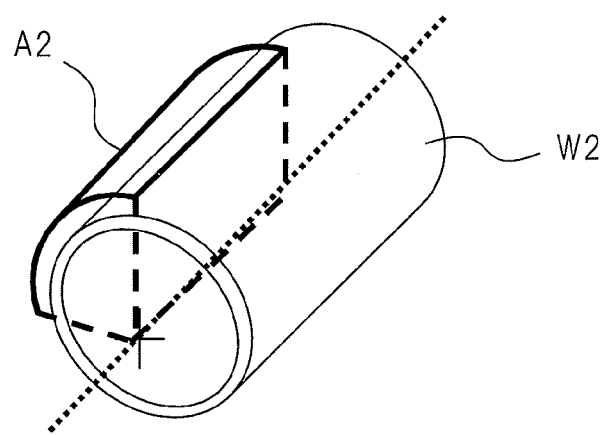
FIG. 8A is a first perspective view of a second workpiece model.
Figure 8B:
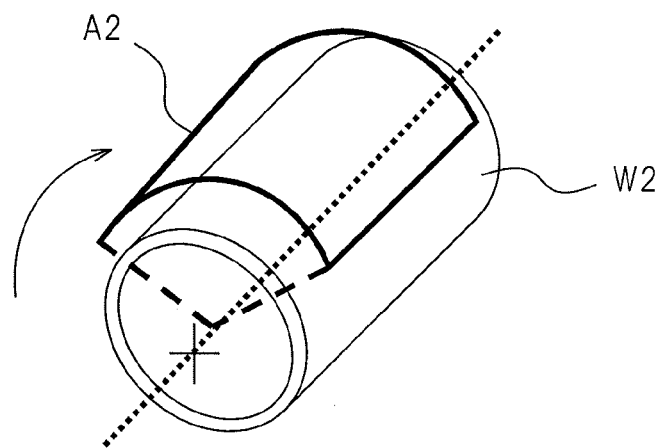
FIG. 8B is a second perspective view of a second workpiece model.
Figure 8C:
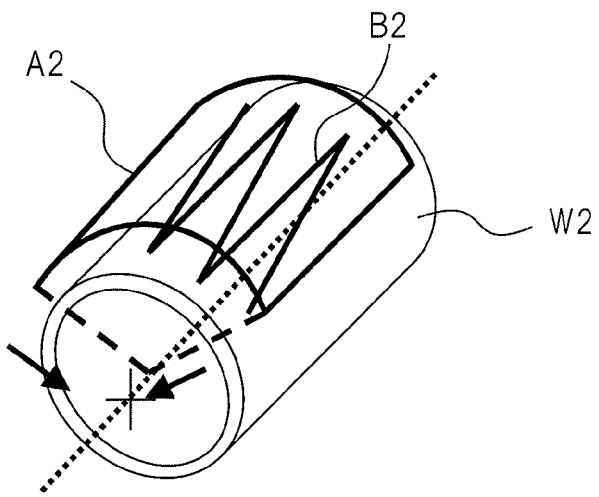
FIG. 8C is a third perspective view of a second workpiece model.

Furthermore, FIG. 8A to FIG. 8C are perspective views of a second workpiece model. Below, referring to FIG. 4 and FIG. 7 to FIG. 8C, the operation of the off-line programming system 10 in a second embodiment of the present invention will be explained.

In FIG. 4 at step S1, as shown in FIG. 7, the robot 13, tool 16, and second workpiece W2 are displayed on the display unit 11. Further, in the second embodiment, the operator selects an approximately figure W-shaped pattern from the operation pattern storage unit 23 and selects the three-dimensional shape A2 which includes a curved surface from the three-dimensional shape storage unit 24 (step S2, step S3).

Then, at step S4, the three-dimensional shape arranging unit 27 fills in the curved surface of the selected three-dimensional shape A2 by the approximately figure W-shaped operation patterns. However, for the purpose of simplification, in FIG. 8A etc., the operation patterns are not shown. Further, as shown in FIG. 8A, the three-dimensional shape arranging unit 27 arranges such a three-dimensional shape A2 inside the virtual space of the display unit 11.

At FIG. 8A, the axial direction of the three-dimensional shape A2 matches the axial direction of the second workpiece W2, but the three-dimensional shape A2 is not arranged at a suitable orientation with respect to part of the circumferential surface of the second workpiece W2. For this reason, the three-dimensional shape arranging unit 27 suitably changes the position/posture of the three-dimensional shape A2 with respect to the second workpiece W2. Due to this, as shown in FIG. 8B, the curved surface of the three-dimensional shape A2 becomes parallel to part of the circumferential surface of the second workpiece W2.

Further, at step S5, the working path preparing unit 28 projects operation patterns which fill in the curved surface of the three-dimensional shape A2 on the outside surface of the second workpiece W2. Due to this, as shown in FIG. 8C, the operation patterns of the three-dimensional shape A2 are projected as the working path B2 on the circumferential surface of the second workpiece W2. Step S6 is substantially the same to that explained above, so a repeat explanation will be omitted.

In this way, in the second embodiment, operation patterns which fill in the curved surface of the three-dimensional shape A2 are projected on the outside of the workpiece W to prepare the working path B2 of the tool 16. For this reason, the prepared working path B2 is suitable for the shape of the circumferential surface of the workpiece W. Furthermore, such a working path B2 may be used as the basis to determine the position or position/posture of the tool 16 as explained above. Therefore, even if the workpiece W itself is cylindrical in shape, the working path B2 can be easily found and, as a result, the number of steps which are required for finding the position or position/posture of the tool 16 can greatly reduced.

Figure 9A:
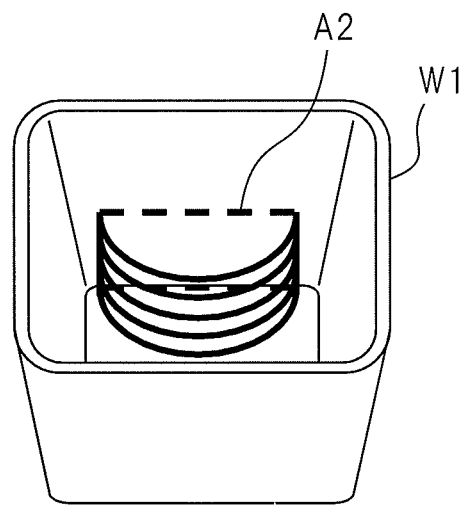
FIG. 9A is a fifth perspective view of a first workpiece model.
Figure 9B:
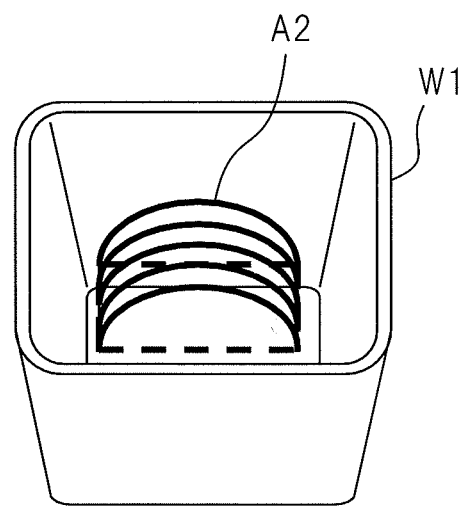
FIG. 9B is a sixth perspective view of a first workpiece model.
Figure 9C:
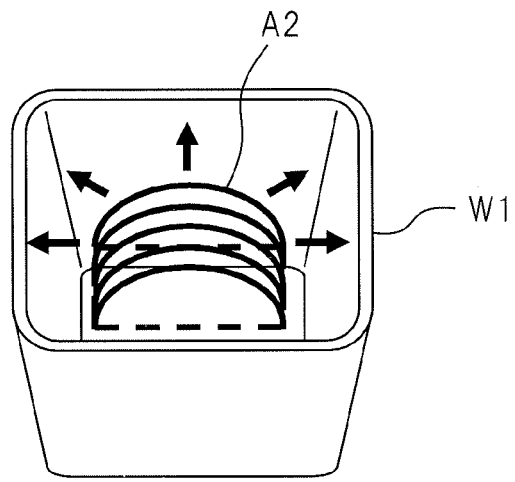
FIG. 9C is a seventh perspective view of a first workpiece model.
Figure 9D:
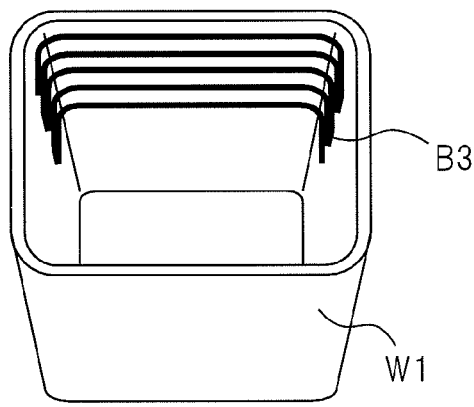
FIG. 9D is an eighth perspective view of a first workpiece model.
Figure 10:
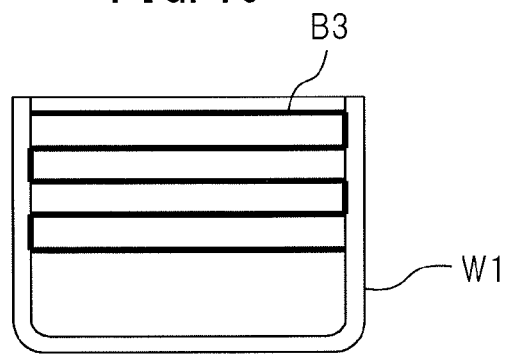
FIG. 10 is a longitudinal cross-sectional view of the first workpiece model which is shown in FIG. 9D.

FIG. 9A to FIG. 9D are perspective views of a first workpiece model. Further, FIG. 10 is a longitudinal cross-sectional view of the first workpiece model which is shown in FIG. 9D. Below, referring to FIG. 4 and FIG. 9A to FIG. 10, another embodiment of the present invention will be explained.

In FIG. 4 at step S1, as shown in FIG. 1, the robot 13, tool 15, and first workpiece W1 are displayed on the display unit 11. Further, in another embodiment, the operator selects an approximately figure U-shaped pattern from the operation pattern storage unit 23 and selects the three-dimensional shape A2 which includes a curved surface from the three-dimensional shape storage unit 24 (step S2, step S3). At this time, as can be seen from a comparison of FIG. 8A and FIG. 9A, the dimensions of the three-dimensional shape A2, for example, the radius, axial direction length, and center angle can be changed as explained later.

Then, at step S4, the three-dimensional shape arranging unit 27 fills in the curved surface of the selected three-dimensional shape A2 by the approximately figure U-shaped operation patterns. Further, as shown in FIG. 9A, the three-dimensional shape arranging unit 27 arranges such a three-dimensional shape A2 inside the first workpiece W1 at the virtual space of the display unit 11.

In FIG. 9A, the three-dimensional shape A2 is not arranged in a suitable orientation with respect to the first workpiece W1. For this reason, the three-dimensional shape arranging unit 27 suitably changes the position/posture of the three-dimensional shape A2 with respect to the first workpiece W1. Due to this, as shown in FIG. 9B, the bottom surface of the three-dimensional shape A2 which faces the curved surface becomes parallel to the bottom surface of the first workpiece W1.

Further, at step S5, as shown in FIG. 9C, the working path preparing unit 28 projects the operation patterns which fill in the curved surface of the three-dimensional shape A2 at the inside surfaces of the first workpiece W1. Due to this, the operation patterns of the three-dimensional shape A2 are projected as the working path B3 at the inside surfaces of the first workpiece W1 (please refer to FIG. 9D).

Further, if referring to FIG. 10, it will be understood that the working path B3 is similar in shape to the selected approximately figure U-shaped operation patterns. Step S6 is generally the same as that explained above, so a repeat explanation will be omitted. In this way, it will be understood that in other embodiments as well, advantageous effects similar to the ones explained above are obtained.

In this regard, in FIG. 5C, the operation patterns which fill in the flat surfaces of the three-dimensional shape A1 are projected on the outside surfaces of the first workpiece W1 in a direction from the inside toward the outside. However, the projection direction designating unit 30 may be used to designate the projection direction.

Figure 11:
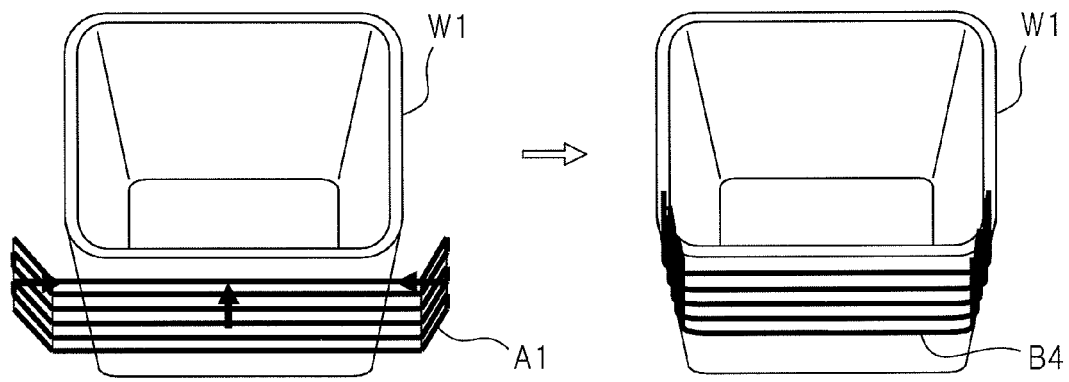
FIG. 11 is a perspective view of a three-dimensional shape and first workpiece model.

FIG. 11 is perspective view of the three-dimensional shape and first workpiece model. In FIG. 11, the three-dimensional shape A1 is arranged at the outside of the first workpiece W1. As illustrated, the three-dimensional shape A1 is larger than the first workpiece W1, and the consecutive plurality of flat surfaces of the three-dimensional shape A1 are filled in by the approximately figure U-shaped patterns.

As shown in FIG. 11 by the black arrow, the projection direction designating unit 30 is used to designate the projection direction as the direction from the outside toward the inside. Due to this, the working path B4 is formed at the outer surfaces of the first workpiece W1. As opposed to this, if the projection direction is a direction from the inside toward the outside, as shown in FIG. 5D, the working path B1 is formed at the inner surfaces of the first workpiece W1.

Figure 12:
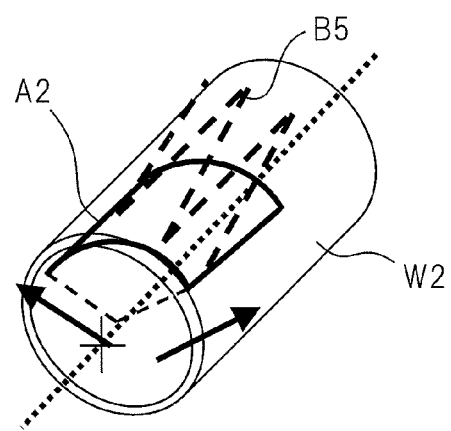
FIG. 12 is a perspective view of a three-dimensional shape and second workpiece model.

FIG. 12 is a perspective view of the three-dimensional shape and second workpiece model. In FIG. 12, the three-dimensional shape A2 is arranged at the inside of the second workpiece W2. As illustrated, the three-dimensional shape A2 is smaller than the second workpiece W2, and the curved surface of the three-dimensional shape A2 is filled in by the approximately figure W-shaped patterns.

As shown in FIG. 12 by the arrows, the projection direction designating unit 30 is used to designate the projection direction as the direction from the inside toward the outside. Due to this, the working path B5 is formed at the inner surfaces of the second workpiece W2. As opposed to this, if the projection direction is a direction from the outside toward the inside, as shown in FIG. 8C, the working path B2 is formed at the outer surfaces of the second workpiece W2.

Figure 13:
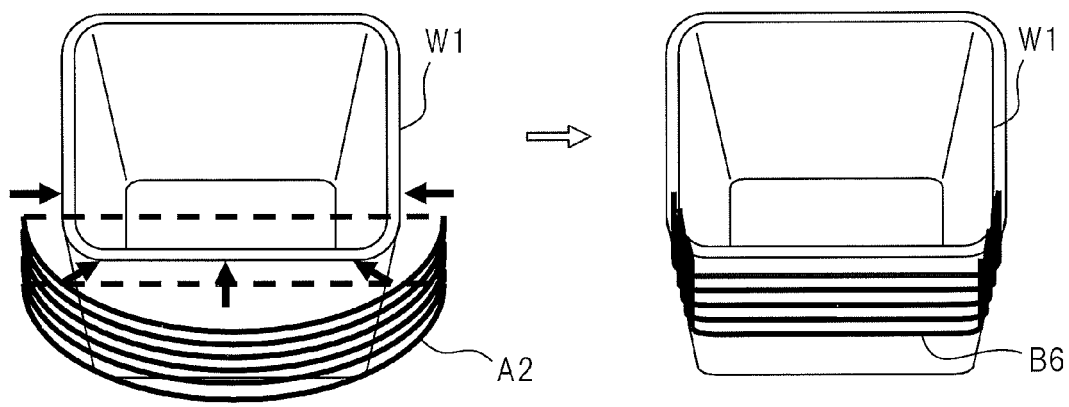
FIG. 13 is a perspective view of a three-dimensional shape and first workpiece model.

Furthermore, FIG. 13 is a perspective view of the three-dimensional shape and first workpiece model. In FIG. 13, the three-dimensional shape A2 is arranged at the outside of the first workpiece W1. As illustrated, the three-dimensional shape A2 is larger than the first workpiece W1, and the curved surface of the three-dimensional shape A2 is filled in by approximately figure U-shaped patterns.

As shown by the black arrows in FIG. 13, the projection direction designating unit 30 is used to designate the projection direction as the direction from the outside toward the inside. Due to this, the working path B6 is formed on the outer surfaces of the first workpiece W1. As opposed to this, if the projection direction is a direction from the inside toward the outside, as shown in FIG. 9D, the working path B3 is formed on the inner surfaces of the first workpiece W1.

Figure 14:
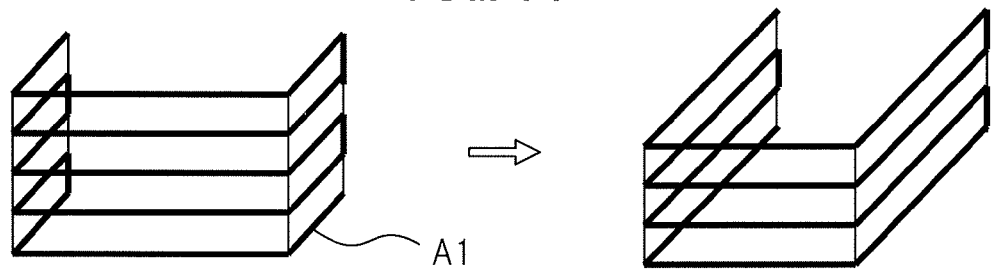
FIG. 14 is a view for explaining a change of a length, width, and depth of a three-dimensional shape.

FIG. 14 is a view for explaining the length, width, and depth of a three-dimensional shape. The three-dimensional shape A1 has three consecutive flat surfaces. As shown in FIG. 14, if the operator uses the dimension changing unit 31, it is possible to change the height of the three-dimensional shape A1 and, further, change the lengths of the two flat surfaces which are positioned at the two ends of the three-dimensional shape A1.

Figure 15:
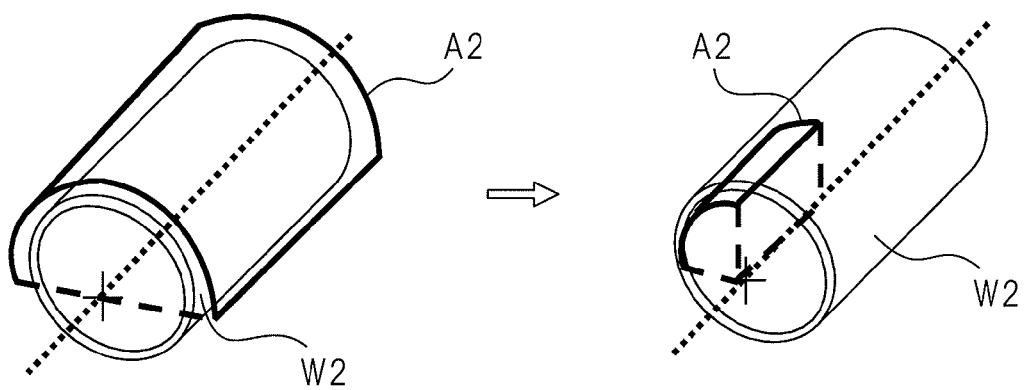
FIG. 15 is a view for explaining a change of a radius and center angle of a three-dimensional shape.

Further, FIG. 15 is a view for explaining a change in the radius and center angle of a three-dimensional shape. The center angle of the three-dimensional shape A2 which is shown in FIG. 15 is about 180°. Further, if the operator uses the dimension changing unit 31, the center angle of the three-dimensional shape A2 can be changed to for example 90°. Further, as can be seen from FIG. 15, the dimension changing unit 31 can also be used to change the axial direction length of the three-dimensional shape A2. In this way, in the present invention, it is possible to change the three-dimensional shape at which operation patterns are projected in accordance with the shape of a workpiece.

Figure 16:
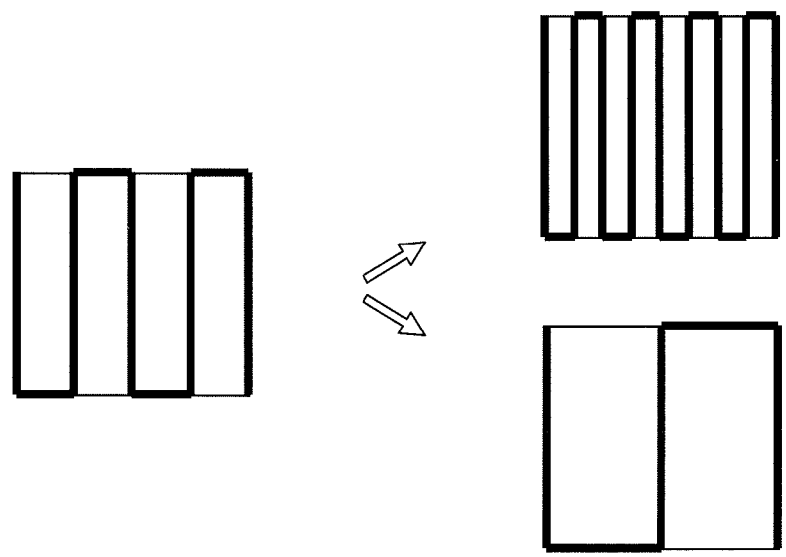
FIG. 16 is a view for explaining a change of a pitch interval of operation patterns.

FIG. 16 is a view for explaining a change of a pitch interval of operation patterns. If working along a formed working path, depending on the performances of the tools 15, 16, sometimes the working density will become too small or will become too large. In such a case, the pitch interval changing unit 32 is preferably used to change the operation patterns. FIG. 16 shows approximately figure U-shaped patterns in the case of making the pitch interval smaller and the case of making it larger. It will be understood that due to such an operation, the working density of the surface of the workpiece to be worked can be changed.

Figure 17A:
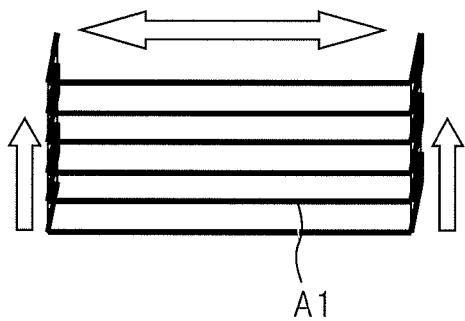
FIG. 17A is a first view for explaining a change of advancing directions of operation patterns.

FIG. 17A, FIG. 17B, FIG. 18A, and FIG. 18B are views for explaining the change of the advancing directions of the operation patterns. FIG. 17A shows the three-dimensional shape A1 which has a consecutive plurality of flat surfaces which have been filled in by approximately figure U-shaped patterns. As shown in FIG. 17A, the approximately figure U-shaped operation patterns of the three-dimensional shape A1 are comprised of reciprocating motions which are repeated in the horizontal direction and vertical direction movements of slight distances which are alternately performed at the ends of the strokes of the reciprocating motions.

Figure 17B:
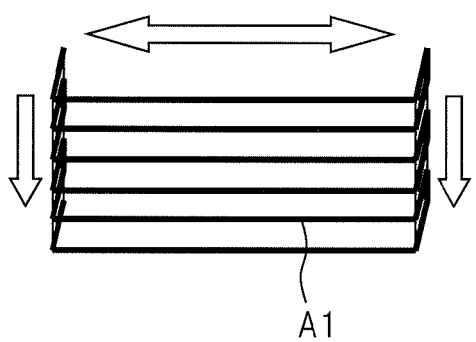
FIG. 17B is a second view for explaining a change of advancing directions of operation patterns.

The vertical direction movements of the operation patterns which are shown in FIG. 17A are from the bottom toward the top. This direction can be designated by the operator by using the direction designating unit 33. FIG. 17B shows the operation patterns which are designated by the direction designating unit 33 in which vertical direction movements from the top toward the bottom are designated.

Figure 18A:
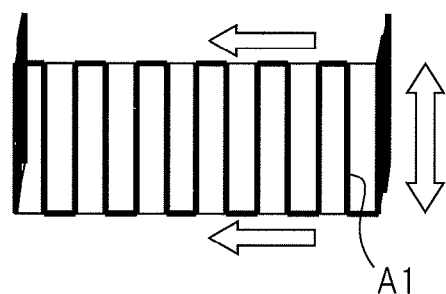
FIG. 18A is a third view for explaining a change of advancing directions of operation patterns.

Similarly, FIG. 18A shows a three-dimensional shape A1 which has a consecutive plurality of flat surfaces which are filled in by approximately figure U-shaped patterns. In FIG. 18A, the direction designating unit 33 is used to designate reciprocating motions in the vertical direction and to designate slight distance movements in the horizontal direction. On this point, this differs from the three-dimensional shape A1 which is shown in FIG. 17A.

Figure 18B:
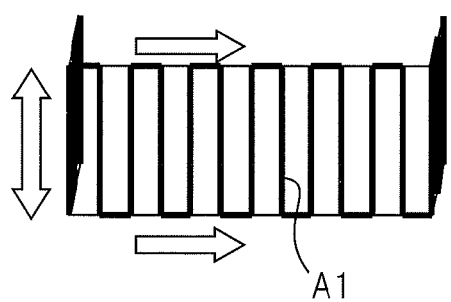
FIG. 18B is a fourth view for explaining a change of advancing directions of operation patterns.

Further, the movements in the horizontal direction in FIG. 18A are from the right to the left. If the direction designating unit 33 is used to designate horizontal direction movements from the left to the right, the three-dimensional shape A1 which is shown in FIG. 18B is obtained. It will be understood that if using the direction designating unit 33 in this way, it is possible to designate the directions of the operation patterns of the three-dimensional shape A1 in accordance with the shape of the surfaces of the workpiece W.

Figure 19A:
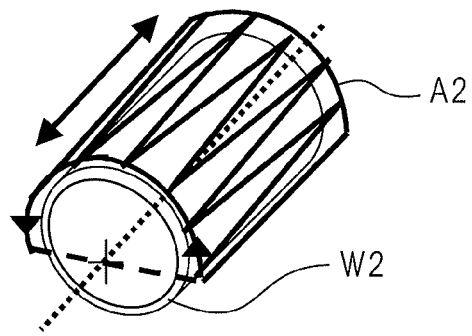
FIG. 19A is a first view for explaining a change of advancing directions of operation patterns when reciprocating motions of the operation patterns are parallel to an axial direction of a three-dimensional shape.
Figure 19B:
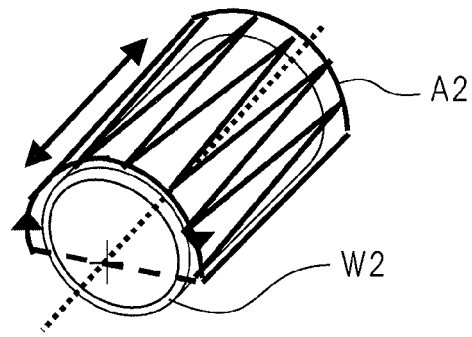
FIG. 19B is a second view for explaining a change of advancing directions of operation patterns when reciprocating motions of the operation patterns are parallel to an axial direction of a three-dimensional shape.

FIG. 19A and FIG. 19B are views for explaining the change of the advancing directions of the operation patterns when the reciprocating motions of the operation patterns are parallel to the axial direction of the three-dimensional shape. In these figures, the curved surface of the three-dimensional shape A2 which is arranged corresponding to the second workpiece W2 is filled in by the approximately figure W-shaped operation patterns. Further, as can be seen from these figures, the approximately figure W-shaped operation patterns of the three-dimensional shape A2 are comprised of reciprocating motions which are repeated substantially in parallel to the axial direction and circumferential direction movements of slight distances which are alternately performed at ends of the strokes of the reciprocating motions.

The circumferential direction movements of the operation patterns which is shown in FIG. 19A are counterclockwise. Further, FIG. 19B shows the operation patterns in which circumferential direction movements in the clockwise direction are designated by the direction designating unit 33.

Figure 20A:
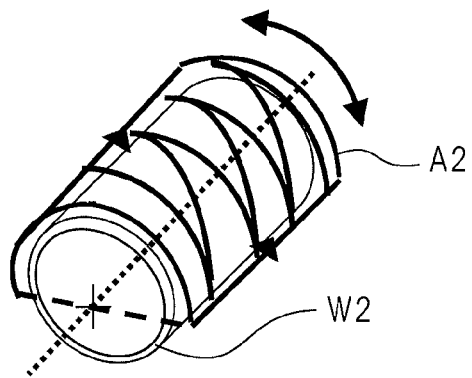
FIG. 20A is a first view for explaining a change of advancing directions of operation patterns when reciprocating motions of the operation patterns are parallel to a circumferential direction of a three-dimensional shape.
Figure 20B:
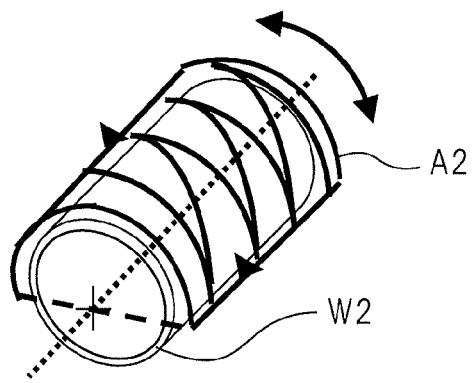
FIG. 20B is a second view for explaining a change of advancing directions of operation patterns when reciprocating motions of the operation patterns are parallel to a circumferential direction of a three-dimensional shape.

Furthermore, FIG. 20A and FIG. 20B are views for explaining the change of the advancing directions of the operation patterns when the reciprocating motions of the operation patterns are parallel to the circumferential direction of the three-dimensional shape. In these figures, a three-dimensional shape A2 which has a curved surface which is filled in by the approximately figure W-shaped operation patterns is similarly shown. Further, as can be seen from these figures, the approximately figure W-shaped operation patterns of the three-dimensional shape A2 are comprised of reciprocating motions which are repeated substantially in parallel to the circumferential direction and axial direction movements of slight distances which are alternately performed at ends of the strokes of the reciprocating motions. In FIG. 20A, the direction designating unit 33 is used to designate reciprocating motions in the circumferential direction and to designate the slight distance movements in the axial direction. On this point, this differs from the three-dimensional shape A2 which is shown in FIG. 19A.

Further, the movements in the axial direction in FIG. 20A are from the base end of the second workpiece W2 toward the front end. If using the direction designating unit 33 to designate movements in the axial direction from the front end to the base end, the three-dimensional shape A2 which is shown in FIG. 20B is obtained. It will be understood that by using the direction designating unit 33 in this way, it is possible to designate the directions of the operation patterns of the three-dimensional shape A2 in accordance with the shape of the surface of the workpiece W.

Figure 21A:
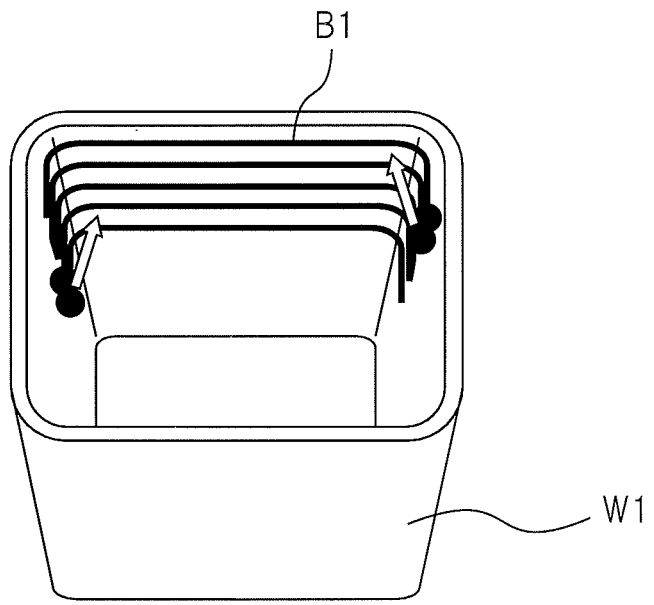
FIG. 21A is another perspective view of a first workpiece model.
Figure 22A:
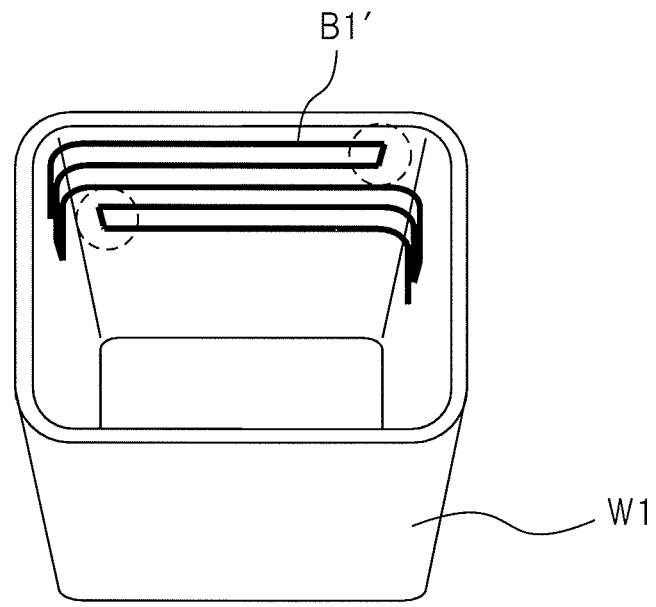
FIG. 22A is still another perspective view of a first workpiece model.

In this regard, FIG. 21A and FIG. 22A are other perspective views of the first workpiece model. In FIG. 21A, the working path B1 which is formed through the approximately figure U-shaped patterns is formed at the inner surfaces of the first workpiece W1. As shown by the black dots in FIG. 21A, the ends of the approximately figure U-shaped patterns are positioned at the two inner surfaces of the first workpiece W1, which are facing with each other.

Figure 21B:
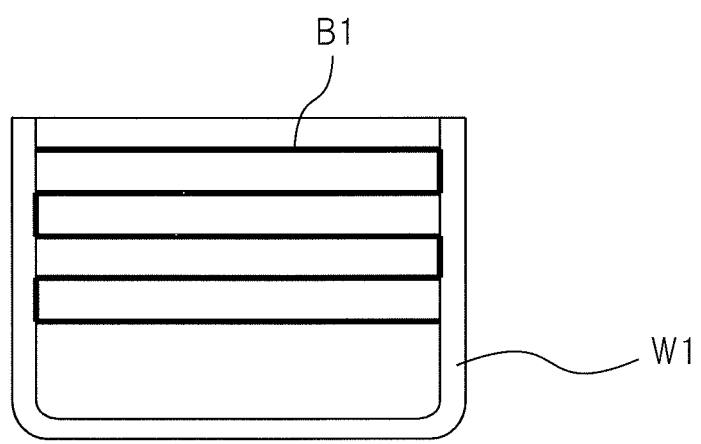
FIG. 21B is a longitudinal cross-sectional view of the first workpiece model which is shown in FIG. 21A.

FIG. 21B is a longitudinal cross-sectional view of the first workpiece model which is shown in FIG. 21A. FIG. 21B shows only the center inner surface among the three consecutive inner surfaces of the first workpiece W1. For this reason, FIG. 21B shows only part of the working path B1. The ends of the approximately figure U-shaped patterns which are shown by the black dots in FIG. 21A are not shown.

Here, the position changing unit 34 changes the positions of the end parts of the operation patterns, that is, the positions of the start points and end points of the reciprocating motions, as desired. The operator operates the position changing unit 34 to thereby make part of the ends of the operation patterns which are shown by the black dots in FIG. 21A move to the directions shown by the white arrows on the display unit 11.

Figure 22B:
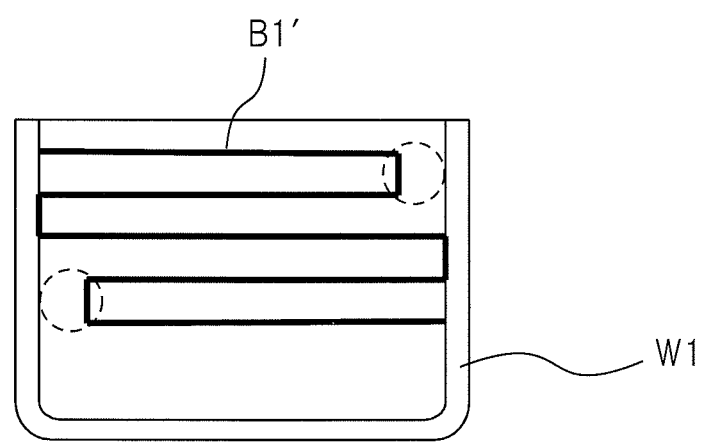
FIG. 22B is a longitudinal cross-sectional view of the first workpiece model which is shown in FIG. 22A.

At the locations which are surrounded by the broken lines in FIG. 22A, the ends of the reciprocating motions of the operation patterns are changed in position. FIG. 22B is a view similar to FIG. 21B which shows a longitudinal cross-sectional view of the first workpiece model which is shown in FIG. 22A. As shown by the broken lines in FIG. 22B, the changed parts of the end parts of the operation patterns are made to move to the center inner surface among the three consecutive surfaces of the first workpiece W1. It will be understood that by using such a position changing unit 34, the working path B1 can be finely adjusted in accordance with the shape of the surface of the workpiece.

Figure 23:
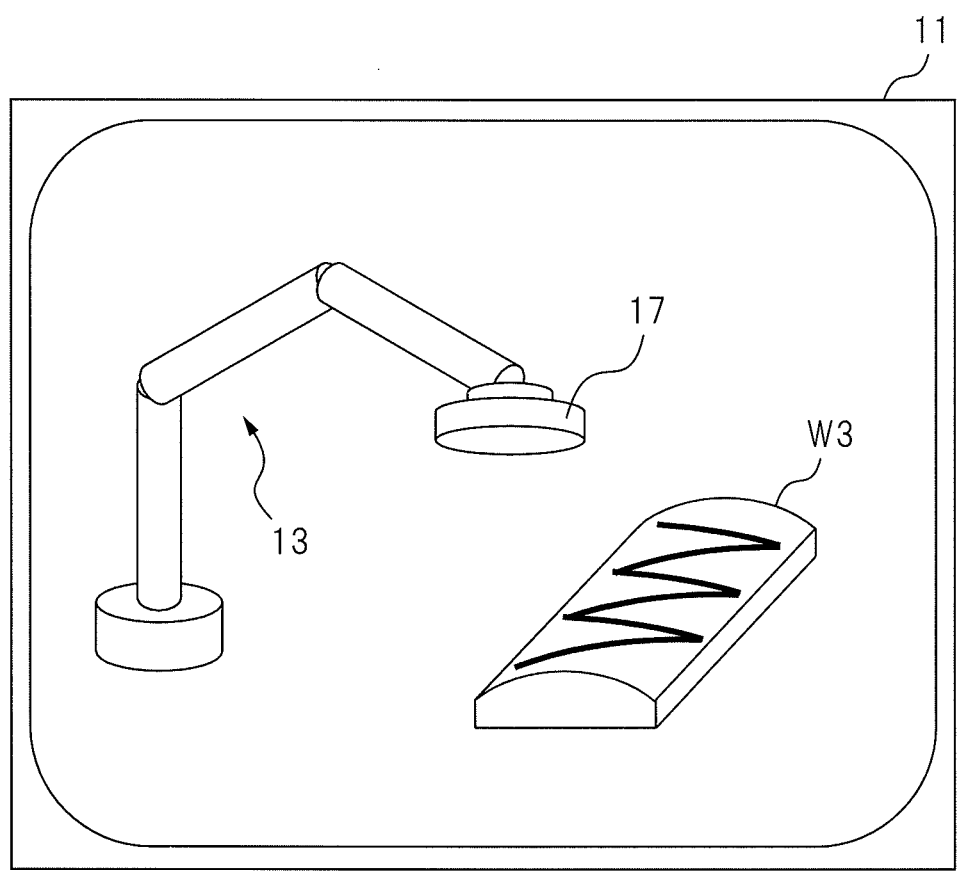
FIG. 23 is a view which shows a display unit of an off-line programming system according to a third embodiment of the present invention.

FIG. 23 is a view which shows a display unit of an off-line programming system according to a third embodiment of the present invention. As can be seen understood from FIG. 23, the display unit 11 shows a model of a robot 13 which is provided with a tool 17 and a model of a workpiece W3. The tool 17 in the third embodiment is an approximately disk-shaped grinder. Further, the workpiece W in FIG. 23 is a plate which has a curved top surface. Below, such a shape of a workpiece W will be called the "third workpiece W3".

Figure 24A:
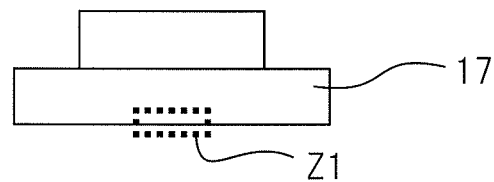
FIG. 24A is a side view of a tool in the case where a contact area of the tool is small.
Figure 24B:
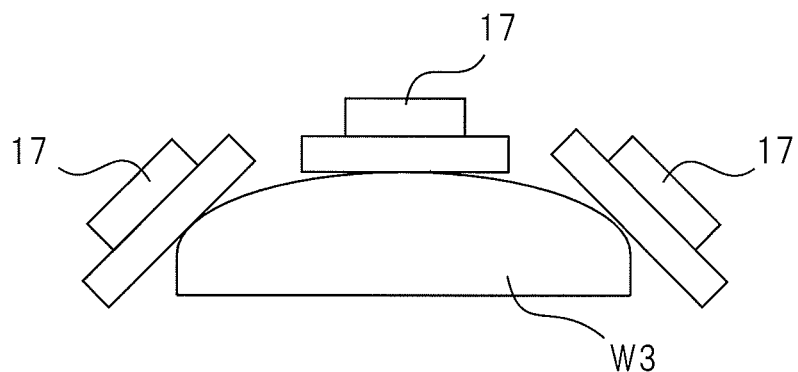
FIG. 24B is a side view of the tool and workpiece which are shown in FIG. 24A.

Furthermore, FIG. 24A is a side view of a tool in the case where the contact region of the tool is small. Further, FIG. 24B is a side view of the tool and workpiece which are shown in FIG. 24A. In FIG. 24A, the contact region of the tool 17 with respect to the workpiece is designated in advance by the contact region designating unit 35 as the contact region Z1. As illustrated, the contact region Z1 is designated near the center of the working surface of the tool 17 and is considerably smaller than the tool 17 itself.

When the tool 17 works the third workpiece W3, the tool 17 has to form a predetermined angle, for example, a right angle, with the location of the third workpiece W3 to be worked. Therefore, if the contact region Z1 is small, as shown in FIG. 24B, the position/posture of the tool 17 when the tool 17 is working the third workpiece W3 is automatically determined from the working path.

Figure 25A:
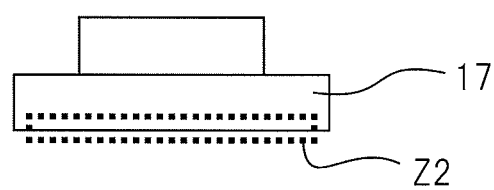
FIG. 25A is a side view of a tool in the case where a contact area of the tool is large.
Figure 25B:
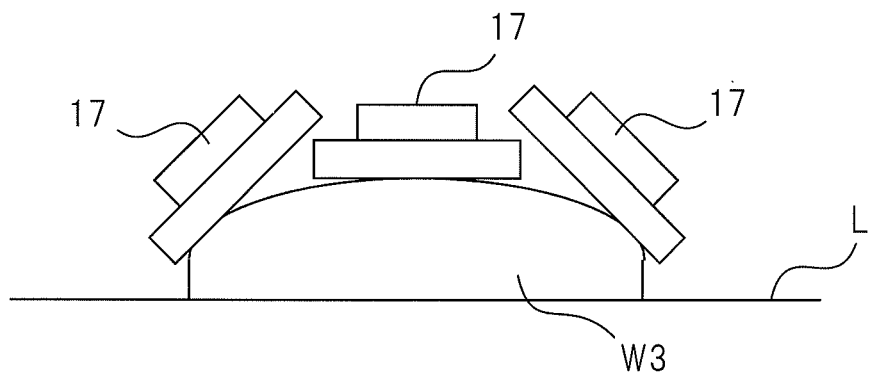
FIG. 25B is a side view of the tool and workpiece which are shown in FIG. 25A.

Further, FIG. 25A is a side view of a tool in the case where the contact region of the tool is large. Further, FIG. 25B is a side view of the tool and workpiece which are shown in FIG. 25A. In FIG. 25A, the contact region of the tool 17 is made one which was changed to the contact region Z2 by the contact region designating unit 35. As can be seen from FIG. 25A, the contact region Z2 is designated as substantially the entire working surface of the tool 17.

In FIG. 25B, the tools 17 are shown at the center part and two edge parts of the third workpiece W3. At the center of the third workpiece W3, the majority of the contact region Z2 contacts the third workpiece W3. The position/posture of the tool 17 is automatically determined from the working path.

As opposed to this, when the tool 17 is present near the edges of the third workpiece W3, the contact region Z2 is large, so sometimes part of the tool 17 contacts the surface L at which the third workpiece W3 is arranged. In the present invention, near the edges of the third workpiece W3, the tool 17 contacts the third workpiece W3 at the part of the contact region Z2 closest to the surface L. Due to this, the position/posture of the tool 17 can be automatically determined from the working path and, similarly, the tool 17 can be kept from contacting the surface L at the time of working the third workpiece W3.

Advantageous Effects of the Invention

In the first aspect, operation patterns which fill in a curved surface or a consecutive plurality of flat surfaces of the three-dimensional shape are projected on the surfaces of the workpiece to prepare a working path of the tool. For this reason, the prepared working path is suitable for the shape of the surface of the workpiece. Furthermore, such a working path can be used as the basis to automatically determine the position or position/posture of the tool. Therefore, even when the surface of the workpiece to be worked includes a curved part or when the workpiece itself is cylindrical in shape etc., the working path can be easily found. As a result, the number of steps which are required for finding the position or position/posture of the tool can be greatly reduced.

In the second aspect, it is possible to change the direction of projection of the operation patterns in accordance with the shape of the surface of the workpiece to be worked.

In the third aspect, it is possible to change the dimensions of the three-dimensional shape which includes a curved surface or the three-dimensional shape which includes a consecutive plurality of flat surfaces. Therefore, it is possible to change the three-dimensional shape which is filled in by the operation patterns in accordance with the shape of the workpiece.

In the fourth aspect, the pitch interval of the operation patterns can be changed in accordance with the shape of the surface of the workpiece. Therefore, the working density of the surface of the workpiece to be worked can be changed. Note that, the operation patterns include, for example, equal velocity movements in one direction accompanied with repeated reciprocating motions in other directions substantially vertical to the same.

In the fifth aspect, it is possible to designate the directions of the operation patterns in accordance with the shape of the surface of the workpiece.

In the sixth aspect, it is possible to finely adjust the working path in accordance with the shape of the surface of the workpiece.

In the seventh aspect, the number of steps for adjusting the position or position/posture of a tool model when the region which was designated by the contact region designating unit would contact the workpiece model can be slashed.

Typical embodiments were used to explain the present invention, but it will be understood that a person skilled in the art could make the above-mentioned changes and various other changes, deletions, and additions without departing from the scope of the present invention.

The invention claimed is:

1. An off-line programming system which teaches a program to a robot which is provided with a tool which works a workpiece which is arranged in a work space, the off-line programming system comprising:
   a virtual space preparing unit which prepares a virtual space which expresses said work space three-dimensionally,
   a model arranging unit which arranges a workpiece model of said workpiece, a robot model of said robot, and a tool model of said tool in said virtual space which has been prepared by said virtual space preparing unit,
   an operation pattern storage unit which stores a plurality of types of the operation patterns which are comprised of consecutive paths which show cyclic operations of said tool,
   a three-dimensional shape storage unit which stores a three-dimensional shape which includes a curved surface and a three-dimensional shape which includes a consecutive plurality of flat surfaces,
   an operation pattern selecting unit which selects one type of operation pattern from said plurality of types of operation pattern which are stored in said operation pattern storage unit,
   a three-dimensional shape selecting unit which selects the three-dimensional shape which includes a curved surface or the three-dimensional shape which includes a consecutive plurality of flat surfaces from said three-dimensional shape storage unit,
   a three-dimensional shape arranging unit which fills in said curved surface or said consecutive plurality of flat surfaces of said three-dimensional shape which was selected by said three-dimensional shape selecting unit by one type of operation pattern which was selected by said operation pattern selecting unit and arranges said three-dimensional shape in said virtual space so that said operation patterns will be projected on at least one surface of said workpiece model,
   a working path preparing unit which projects said operation patterns which fill in said curved surface or said consecutive plurality of flat surfaces of said three-dimensional shape on said at least one surface of said workpiece model to prepare a working path of said tool, and
   a tool position/posture determining unit which uses said working path which was prepared by said working path preparing unit and a normal direction of said at least one surface of said workpiece model as the basis to automatically determine (i) the position, or (ii) the position and posture of said tool model.

2. The programming system as set forth in claim 1, further comprising a projection direction designating unit which designates a direction of projection of said operation patterns which fill in said curved surface or said consecutive plurality of flat surfaces of said three-dimensional shape on said at least one surface of said workpiece model.

3. The programming system as set forth in claim 1, further comprising a dimension changing unit which changes a dimension of said three-dimensional shape.

4. The programming system as set forth in claim 1, further comprising a pitch interval changing unit which changes a pitch interval of said cyclic operation at said operation patterns.

5. The programming system as set forth in claim 1, further comprising a direction designating unit which designates at least one of an advancing direction and reciprocating direction of said tool which is shown by said operation patterns.

6. The programming system as set forth in claim 1, further comprising a position changing unit which changes a start point and end point of reciprocating motion in said operation patterns.

7. The programming system as set forth in claim 1, further comprising
- a contact region designating unit which designates a contact region of said tool which contacts said workpiece in said virtual space and wherein
- said tool position/posture determining unit uses said contact region which was designated by said contact region designating unit as the basis to automatically find (i) the position, or (ii) the position and posture of said tool model when contacting said workpiece model from said working path.

\* \* \* \* \*

UNITED STATES PATENT AND TRADEMARK OFFICE
CERTIFICATE OF CORRECTION

PATENT NO.         : 8,694,158 B2                                              Page 1 of 1
APPLICATION NO.    : 13/850807
DATED              : April 8, 2014
INVENTOR(S)        : Hiroyuki Atohira It is certified that error appears in the above-identified patent and that said Letters Patent is hereby corrected as shown below:

On the Title Page: Add

Item (30) Foreign Application Priority Data --May 30, 2012 (JP) 2012-123053--.

Signed and Sealed this
Seventeenth Day of June, 2014

Michelle K. Lee
*Deputy Director of the United States Patent and Trademark Office*